(12) United States Patent
Carle et al.

(10) Patent No.: US 7,245,899 B2
(45) Date of Patent: Jul. 17, 2007

(54) PORTABLE RESCUE DEVICE AND A METHOD FOR LOCATING SUCH A DEVICE

(75) Inventors: Fredrik Carle, C/o Bratt, Östermalmsgatan 78, SE-112 50 Stockholm (SE); Andrei Koptioug, Östersund (SE)

(73) Assignee: Fredrik Carle, Stockholm (SE)

( * ) Notice: Subject to any disclaimer, the term of this patent is extended or adjusted under 35 U.S.C. 154(b) by 80 days.

(21) Appl. No.: 11/009,081

(22) Filed: Dec. 13, 2004

(65) Prior Publication Data
US 2006/0128354 A1  Jun. 15, 2006

(51) Int. Cl.
*H04M 11/00* (2006.01)
*H04Q 7/00* (2006.01)
(52) U.S. Cl. .................... 455/404.1; 370/328
(58) Field of Classification Search ........... 455/404.1, 455/100, 404.2; 370/328
See application file for complete search history.

(56) References Cited

U.S. PATENT DOCUMENTS

| 4,414,550 | A | * | 11/1983 | Tresselt | ............... | 343/700 MS |
| 4,850,031 | A | | 7/1989 | Allsop et al. | | |
| 6,167,249 | A | | 12/2000 | Hereford et al. | | |
| 6,484,021 | B1 | * | 11/2002 | Hereford et al. | ......... | 455/404.1 |
| 6,567,036 | B1 | | 5/2003 | Eckhard | | |
| 6,868,074 | B1 | * | 3/2005 | Hanson | ................ | 370/328 |

FOREIGN PATENT DOCUMENTS

| DE | 2 783 607 A1 | 3/2000 |
| EP | 0 400 489 A2 | 12/1990 |
| EP | 1 180 696 A2 | 2/2002 |
| EP | 1 229 343 A1 | 8/2002 |
| WO | WO 03/083504 A1 | 10/2003 |

* cited by examiner

*Primary Examiner*—Joseph Feild
*Assistant Examiner*—Kiet Doan
(74) *Attorney, Agent, or Firm*—Finnegan, Henderson, Farabow, Garrett & Dunner, LLP

(57) ABSTRACT

A portable rescue device and a method for locating, by means of a first rescue device set in a search mode, a second rescue device set in a distress mode. In the method, a distress signal carrying a device identification is received from said second rescue device. A first bearing and a second bearing to the second rescue device are obtained. The first and second bearings are taken from a first and a second position, respectively. A distance between these positions is determined. A current distance and a current bearing to the second rescue device are determined on basis of the first and second bearings and the distance. The current bearing and the current distance are communicated to a user of the first rescue device.

The portable rescue device is used for performing the method and for that purpose it includes a first communication unit for distress signal transmission and reception; a compass; a processor; a user interface; and a mode switch for switching between a search mode and a distress signal mode. The first communication device has an antenna structure that provides directional capability.

17 Claims, 5 Drawing Sheets

PORTABLE RESCUE DEVICE AND A METHOD FOR LOCATING SUCH A DEVICE

FIELD OF THE INVENTION

The present invention relates to a portable rescue device, which in particular is adapted to alpine use, and a method for locating, by means of a first rescue device set in a search mode, a second rescue device set in a distress mode.

BACKGROUND OF THE INVENTION

When persons, such as skiers, hikers, mountaineers, hunters, snowmobilers, military personnel, etc., are moving around in nature there is risk, in particular during winter and spring, of accidents. In particular avalanches pose a life-threat to these persons. Portable rescue devices are often used by these persons, in order to increase the chances for them to be found when an accident has occurred that stops them from moving on. Often, and in particular in case of an avalanche, the victims cannot be seen or heard or are very difficult to see or hear. Then the portable rescue device may save lives by providing an electronic location system, which is useful independently of visible sight.

One prior art device is disclosed in U.S. Pat. No. 6,484,021 to Hereford et al. That prior art device is arranged for transmitting and receiving a signal from another rescue device. It uses two antennas mounted perpendicular to each other and a virtual third antenna for receiving a distress signal and for being able to determine, by means of a processor, an approximate direction and an approximate distance to the sending device. The direction is presented by means of five LEDs, one of which is illuminated to give a rough indication of the direction to the victim relative to the direction that the device is pointing at. The distance calculations are based on received signal strength. The rescue operation is often time critical. For every minute gained a life may be saved. The prior art solution provides rather wide margins of error both as regards the angle of direction towards the victim and as regards the distance to the victim.

SUMMARY OF THE INVENTION

It is an object of the present invention to provide a rescue device and a method of locating a rescue device that eliminates the above-mentioned drawbacks of the prior art and provides for substantially decreased margins of error.

This object is achieved by a portable rescue device according and a method for locating, by means of a first rescue device set in a search mode, a second rescue device set in a distress mode according to the present invention.

The device and method according to this invention makes use of so called triangulation in order to obtain a reliable position of the victim. Thus, by means of a first searching rescue device two bearings, from two different positions, to the rescue device carried by the victim, and sending a distress signal, are obtained. Further, the distance between the two positions is obtained. Two bearings plus the distance enables, by rather simple mathematical operations, the first searching rescue device to determine very exact values for the distance and direction, i.e. bearing, to the victim from the searching rescue device.

According to one aspect of the present invention the portable rescue device has a first communication unit, which comprises a distress signal transmitter and a distress signal receiver. The receiver includes a directional antenna structure having multiple antennas, which are arranged so as to provide directional capability. The device also includes a compass, a processor, a user interface, and a mode switch. The mode switch is used for switching between at least a search mode and a distress signal mode. Each distress signal carries a device identification of the transmitting rescue device. The portable rescue device, when in said search mode, is arranged to receive a distress signal from another rescue device, which is in the distress signal mode, and obtain at least two different bearings to said another rescue device. The bearings are taken at different positions. The device is also arranged to obtain information about at least one distance between at least two of said different positions, and use the bearings and corresponding at least one distance for calculating a current distance and a current bearing from the portable rescue device to the other rescue device. The device is also arranged to communicate said current distance and current bearing to a user of the rescue device.

The use of two different bearings and a distance between the positions where the bearings have been taken provides for an accurate trigonometric calculation of the position of the victim. In addition the device identification ascertains that the bearings are actually measured towards the same transmitting source. In case two victims are involved, otherwise unnecessary errors could occur. There are several different possibilities for obtaining the distance between bearings, some of which are described in embodiments below.

In an embodiment of the portable rescue device according to this invention, it comprises a second communication unit, arranged to communicate with another rescue device set in the search mode. This opens a lot of possibilities for cooperation between devices, which can further shorten the time it takes to find a victim.

In a further embodiment of the portable rescue device according to this invention the portable rescue device is arranged to obtain at least one of said at least two different bearings from another rescue device by means of said second communication unit. This is one example of an advantageous cooperation between searching devices.

On the other hand, in case the portable rescue device is a sole searching unit, in accordance to a further embodiment thereof, it is arranged to determine said at least two bearings and said at least one corresponding distance itself, and to request the user to move said at least one distance. There are several possible ways to determine the distance. One option is to use a relative measure that is useable for the user, such as a number of steps, or the like. The user may choose the measure. Then also said current distance is presented by means of the same relative measure. Another option is using a GPS (Global Positioning System) device.

In a further embodiment of the device according to this invention, it additionally comprises an input terminal for connecting an external sensor, wherein said processor is arranged to process environmental data received from said external sensor via said input terminal. Such environmental data is for example useful in deciding which victim to rescue first in case of more than one victim whose distress signals are received.

In a further embodiment of the portable rescue device according to this invention, the environmental data includes body data of a user carrying the external sensor. Such body data may include one or more of body temperature, pulse and breathing rate. Other environmental data that could be of interest is, for example, air temperature and other weather oriented data.

In a further embodiment of the portable rescue device according to this invention the environmental data is carried by the distress signal. It is advantageous to only have to use one transmitter to transmit a lot of individual information in addition to the basic signal used by a searching device to perform the very detection of a victim.

In a further embodiment of the portable rescue device according to this invention the processor has a temporary disabling capability, wherein the portable rescue device, when in distress mode, at the reception of a disable signal is disabled and then automatically enabled again after a preset time. More particularly, the portable rescue device at the reception of a turn off signal stops sending the distress signal for said preset time. This is advantageous in that the searching rescue device is allowed to turn off all but one distress signal transmitter, as defined below in an embodiment of the method according to this invention, in order to easier find the one that is left. Additionally, the transmitting devices are saving power during the silent time period.

In a further embodiment of the portable rescue device according to this invention, wherein said multiple antennas are at least eight antennas, which are symmetrically distributed around a circle at equidistant angles. This provides an antenna structure having very good directional properties.

In accordance with another aspect of the present invention, the method comprises the steps of:

receiving a distress signal carrying a device identification from the second rescue device;

obtaining a first bearing to said second rescue device, said first bearing taken from a first position;

obtaining a second bearing to said second rescue device, said second bearing taken from a second position;

obtaining a distance between said first and second positions;

determining a current distance and a current bearing to said second rescue device on basis of said first and second bearings and said distance; and communicating said current bearing and said current distance to a user of the first rescue device.

The advantages of the method correspond to those of the device as explained above. There are a number of embodiments of the method that correspond to the embodiments of the device as discussed above. However, there are some further embodiments of the method now to be discussed.

In an embodiment of the method according to the present invention, it further comprises the steps of:

determining that several different distress signals are received;

determining that there are several rescue device in search mode;

automatically grouping said rescue devices in at least two groups, and automatically distributing said several distress signals among said at least two groups. These steps are performed by a device that is set in the search mode. In this way several devices cooperates in order to divide the searching devices into groups, divide the victims into groups, and dedicate each search group to one of the victims group. Of course, when the search groups have started to find the victims they can be rearranged in the same way. Thereby the efficiency of the rescue operation is substantially increased.

These and other aspects of the invention will be apparent from and elucidated with reference to the embodiments described hereinafter.

BRIEF DESCRIPTION OF THE DRAWINGS

The invention will now be described in more detail and with reference to the appended drawings in which.

DESCRIPTION OF PREFERRED EMBODIMENTS

Figure 1:
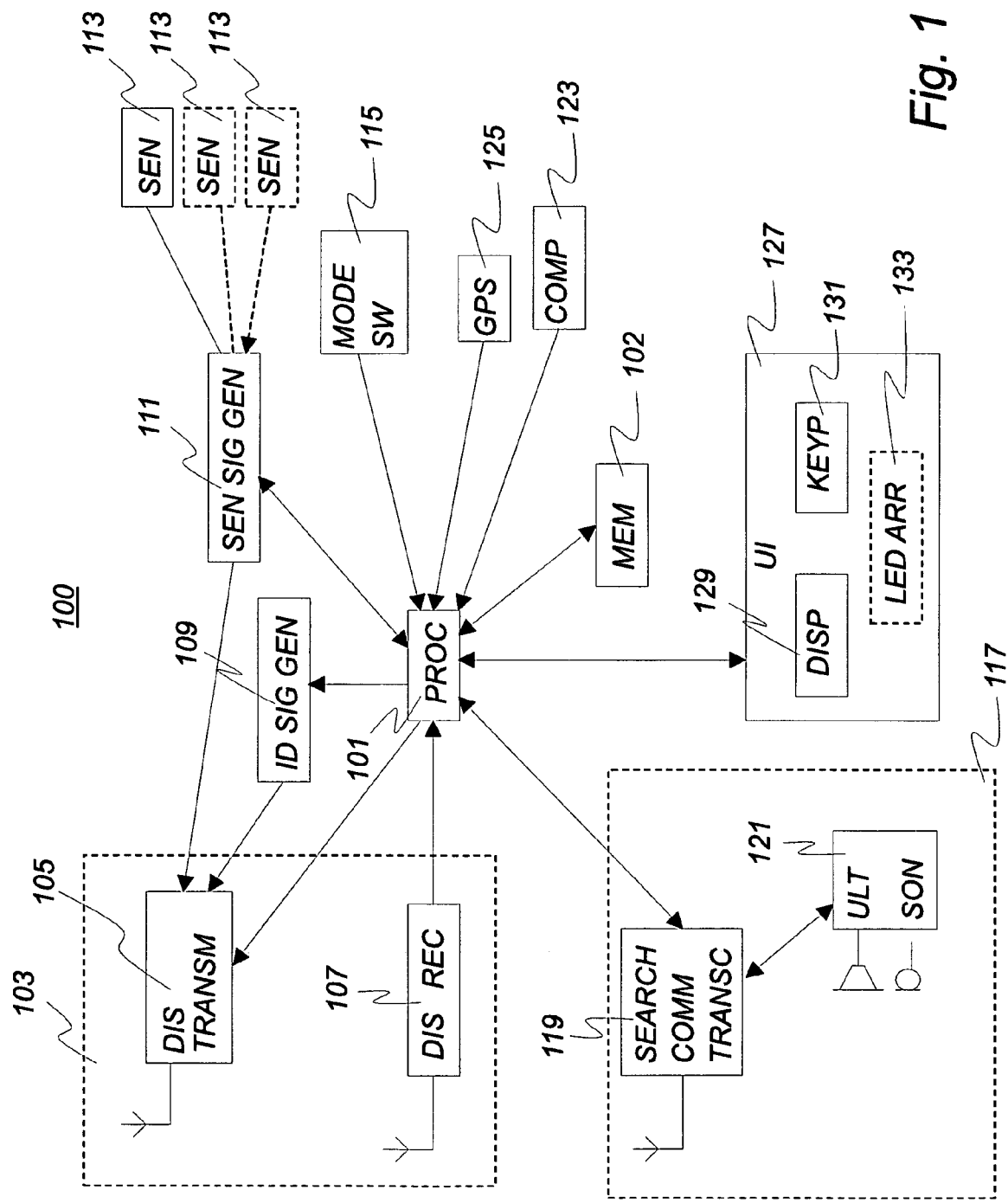
FIG. 1 is a schematic block diagram of an embodiment of a portable rescue device according to the present invention.
Figure 2:
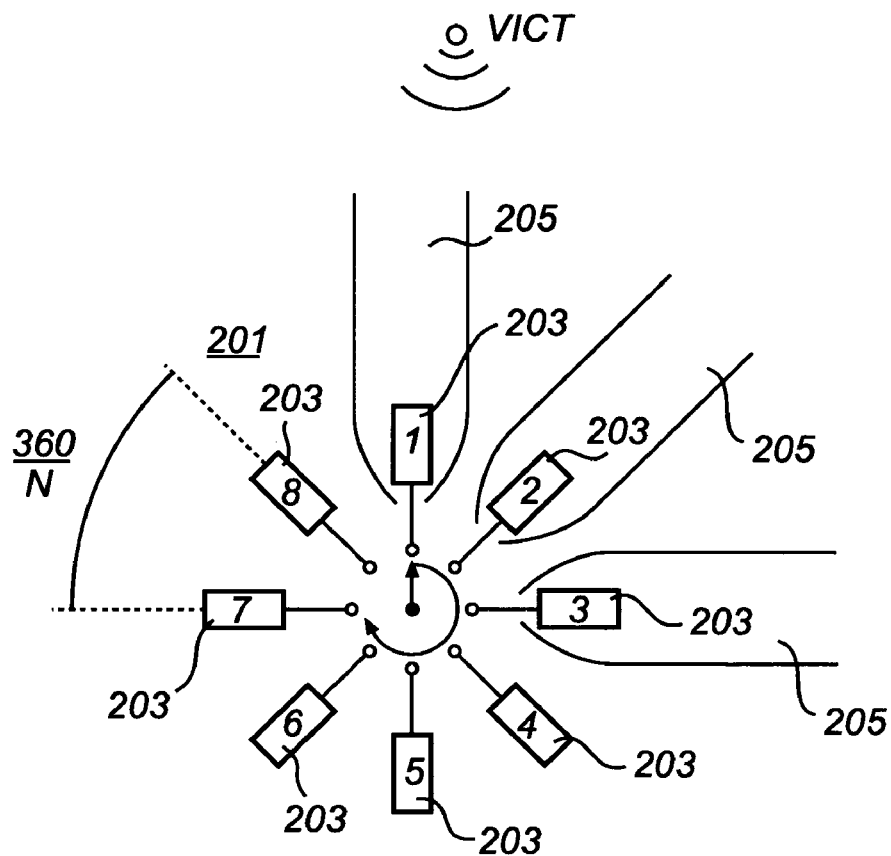
FIG. 2 is a schematic view of an antenna structure employed in the embodiment in FIG. 1.

Referring to FIG. 1 a block diagram of an embodiment of the portable rescue device 100 is shown. The device 100 is meant to be carried by a user when she/he is moving around in the wilderness, as exemplified above in conjunction with the description of background of the invention. The device 100 has a processor 101, such as a microprocessor or a CPU, that is central for providing an amount of intelligence to the device. A first communication unit 103, shown as a dashed box, is connected to the processor for handling the transmission and reception of distress signals. The first communication unit 103 includes a distress transmitter 105 including a first antenna for transmitting, more particularly broadcasting, a distress signal from the device. It also includes a distress receiver 107 including a directional antenna structure, which is an assembly of several antennas. The antenna structure of this embodiment is shown in FIG. 2 and will be further described below. An identification signal generator 109 is connected to the distress transmitter 105 in order to add an identifier, that is unique for every device, to the distress signal that is broadcasted. Further, a sensor signal generator 111 is connected to the distress signal transmitter 105 as well as to the processor 101. The sensor signal generator 111 provides input terminals for connecting external sensors 113 to the device 100. In this embodiment, a body parameter sensor 113 is connected to provide different user data in the form of parameters sensed on the body of the user of the device 100. Typical parameters are body temperature, pulse and breathing rate, but other parameters are possible as well. The sensor signal generator 111 applies a sensor signal, providing the information input by the sensor(s), to the distress transmitter for adding the sensor signal to the distress signal that is broadcasted.

The device 100 further comprises a mode switch 115 for switching the device between a distress mode and a search mode. In the distress mode, the transmitting part of the first communication unit 105 is used, while in the search mode the receiving part thereof is used. The search mode is used when a user of the device 100 solely or as a member of a rescue team is involved in a rescue operation where one or more victims of an accident are to be located. In the search mode, further units of the device 100 are also useable. A second communication unit 117, shown as a dashed box, includes a search communication transceiver 119, including an antenna, which is used for communication with other devices which are also set in the search mode. The communication is used for enhancing the rescue operation. The time it takes to find a person can be extremely reduced if the possibilities provided by this invention are fully utilized as will be evident from this description.

While the carrier frequency of the distress signal preferably is one of the ISM (Industrial Scientific and Medical) frequencies, for example 6.78 MHz, 13.56 MHz, 27.125 MHz, 40.680 MHz, etc., in the medium frequency range, the communication transceiver preferably operates on one of the ISM frequencies in the high frequency range, such as 433.92 MHz, 2.45 GHz, etc. The frequencies exemplified for the communication between searching devices are commonly used in many areas, and thus cheap standard components, such as transceivers, are available. Unfortunately the attenuation of such high frequencies when the radio signal passes through snow is too high, while the lower frequencies are substantially less attenuated. Therefore the lower frequencies are more suitable for the distress signal transmission. The second communication unit 117 further comprises a distance meter 121. In this embodiment it is realised as an ultrasonic meter 121, by means of which the distance to another device of the rescue team is measured. How the distance value is used will be described below. Alternatively, the distance meter 121 is a radio frequency distance meter, where the propagation time for the radio frequency signal one or more times back and forth between the devices is measured.

An electronic compass 123 is connected to the processor 101 for providing a direction reference.

The device 100 is provided with a terminal for connecting a GPS 125 in order to provide absolute position values.

The device further comprises a user interface, connected to the processor 101 and comprising a display 129 and a keypad 131, and possibly a LED array 133.

The operation of the device will now be described. By default the mode switch 115 is set in the distress mode. Thereby the device 100 will always be in the correct mode when an accident happens. In the distress mode the distress transmitter 105 broadcasts the distress signal carrying the device identification and the user data obtained by the sensor 113. In order to save power, since the portable device is battery-powered, the distress signal is sent in bursts. Thereby a high peak power and a low average power is achieved.

In the distress mode, a disable signal, or command, may be received at the distress receiver 107. The disable command is sent from another rescue device, which is set in the search mode. At the reception of such a disable command the processor 101 turns off the distress transmitter 105 during a predetermined time period, and then the processor 101 turns on the distress transmitter 105 again. Additionally, a transmission power increase signal, or command, may be received from another rescue device, which is set in the search mode. At the reception of such a power increase command the processor is pre-programmed to enter a continuous state, where the distress signal is continuously transmitted and at maximum power. The burst state is regained at the reception of a transmission power decrease command. The use of these commands will be described below.

Figure 4:
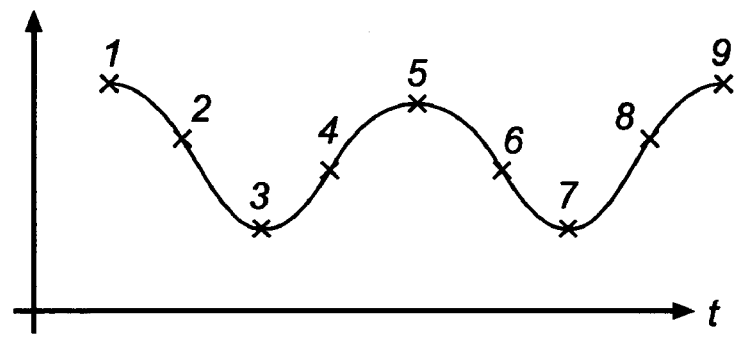
FIG. 4 is a time diagram of antenna signal detection in the antenna structure in FIG. 2.

In a situation where a person, carrying a portable rescue device, is missing due to some accident and another person also carrying a device is going to try to find the lost person, the searching person switches the device into the search mode by means of the mode switch 115. In the search mode the distress receiver is used for detecting distress signals and obtaining directional information about where the distress signal is sent from. In order to obtain a good precision in the directional value, the directional antenna structure of the distress receiver 107 is designed as most schematically shown in FIG. 2. Thus, the antenna structure 201 comprises eight antennas 203, which are arranged in a ring configuration. More particularly, the antennas 203 are symmetrically distributed around a circle at equidistant angles. Since there are eight antennas, the angle between any two thereof is 360/8=45°. Each antenna has a narrow directivity pattern 205, i.e. the lobe within which the antenna has a full sensitivity to received signals. Further, the antenna structure 201 comprises a rotating receiver switch 207, consecutively connecting the antennas 203, one at a time, to the very receiver circuitry of the distress receiver 107. The strengths (amplitudes) of the received signals are stored in the memory. They can be illustrated by a time diagram as shown in FIG. 4. The antennas 203 are numbered 1 to 8. Assume that the victim's device is located almost straight ahead of the antenna No. 1, as shown in FIG. 2, and that no more distress signal is received by the antenna structure 201. Then a possible diagram is shown in FIG. 4. It can be seen that the highest value is, of course generated by antenna No. 8, and the second highest by antenna No. 5, directed opposite to antenna No. 1. The lowest values are generated by antennas No. 3 and 7, turned 90° and 270° (or ±90°), respectively, from antenna No. 1. In this way it is determined that the victim is in the direction that antenna No. 1 points. An approximate bearing is determined by means of the compass 123.

Figure 3:
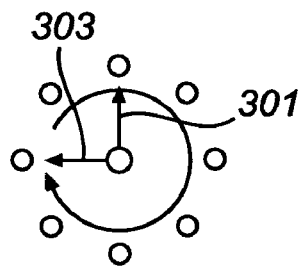
FIG. 3 illustrates the principle of an alternative antenna structure.

Alternatively, as shown in FIG. 3, the antenna structure comprises two rotating receiver switches 301, 303. The switches are 90° displaced relative each other. In this embodiment two parallel time diagrams are generated. In other words, at every moment of time two antennas at an angular spacing of 90° are sampled.

Figure 5:
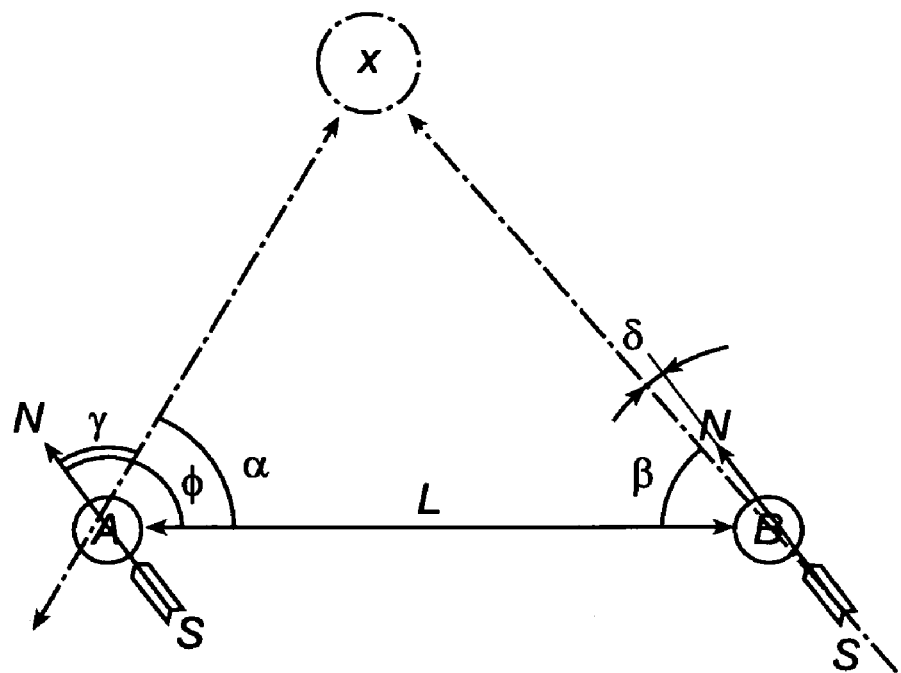
FIG. 5 illustrates the principles of triangulation as applied by the embodiment of FIG. 1.
Figure 7:
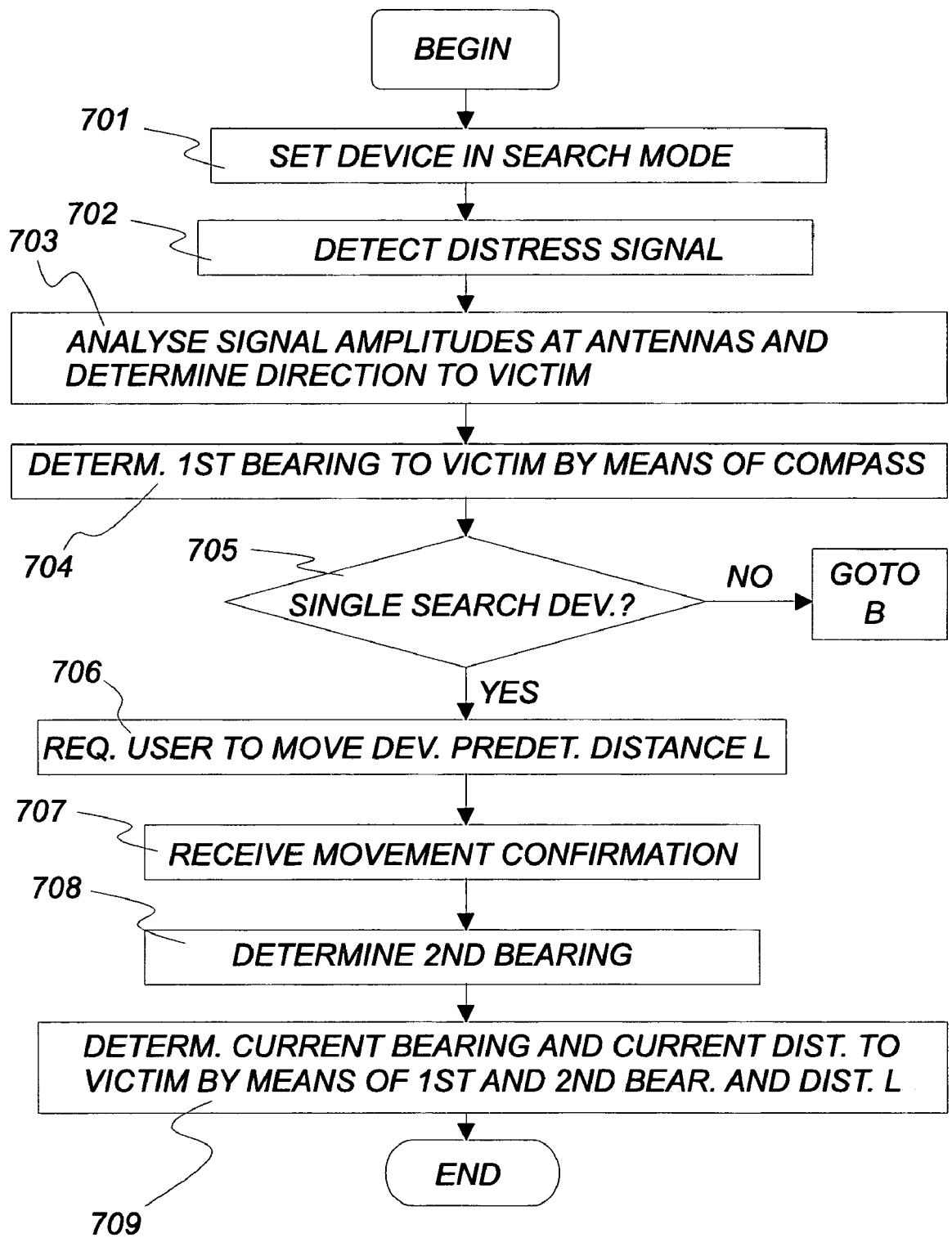
FIGS. 7 and 8 are flow charts showing steps of an embodiment of the location method according to the present invention.
Figure 8:
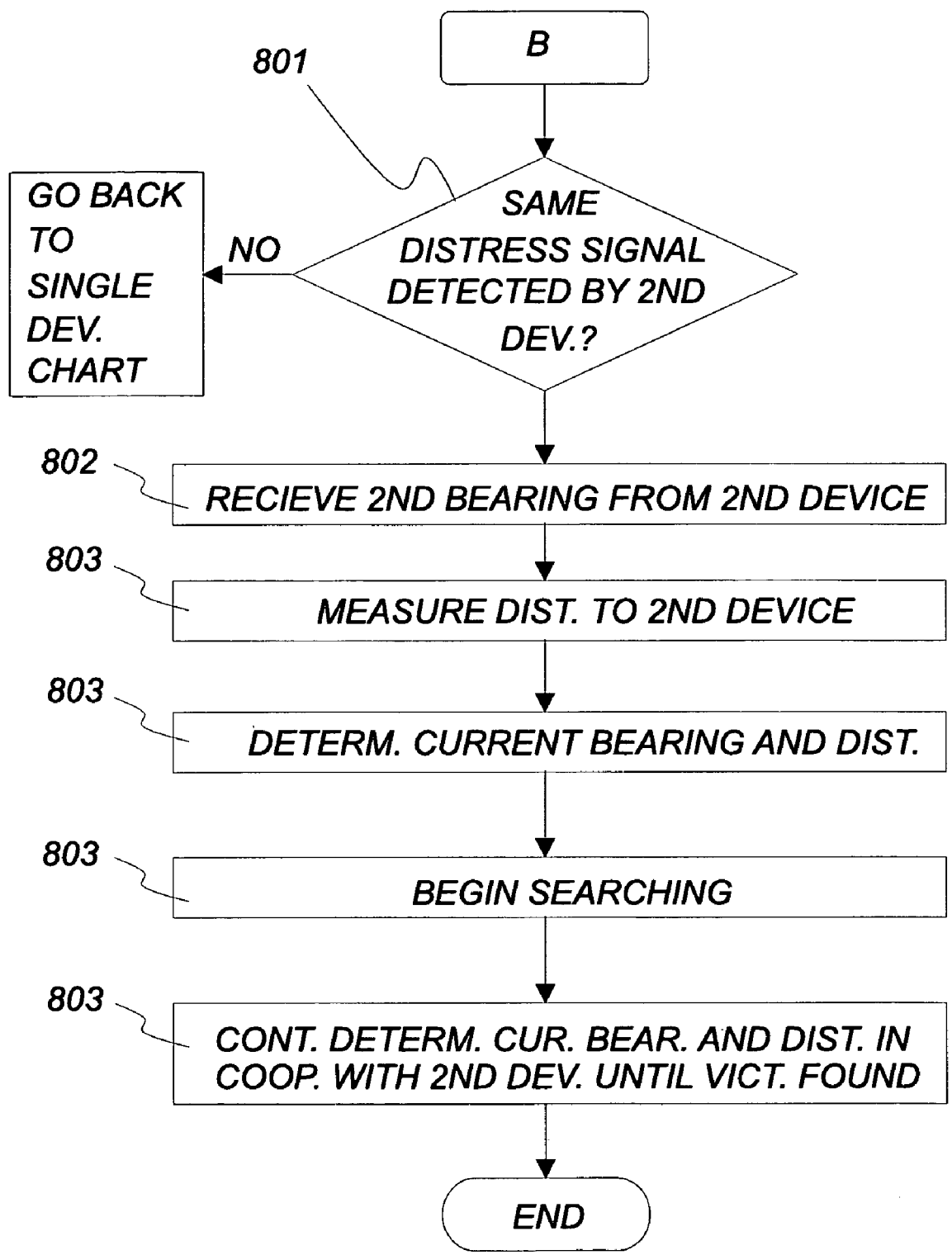

Now the method of locating the victim by means of a single device as well as by means of multiple devices will be described. In FIG. 5 the parameters necessary for performing the triangulation are illustrated. In FIGS. 7 and 8 the method steps for a couple of different situations are shown. Starting with the single search device—single victim case, at first the searching device is in a first position A. The device is set in the search mode, step 701. A distress signal is detected, i.e. received, from the device of the victim, step 702. By analysing the signal amplitudes of the antennas 203 a preliminary direction to the victim X is determined, step 703. A first bearing to the victim X is determined, step 704, as an angle γ with the compass north direction, i.e. the angle between compass north and the approximate direction to the victim determined by means of the antenna structure 201. Then the user is requested, at the display or by means of a synthesised voice, to move sideways, or at least in a direction causing some lateral displacement in relation to the victim, a distance L chosen by the user and to input that distance as a number, step 706. For example the user may choose to measure the distance in steps, ski pole strokes, or simply meters. Anyhow it should be a magnitude that the user is able to estimate fairly well, since the resulting distance to the victim will then be given as a number of the same magnitude.

When the user has moved that distance, into a new position B, he pushes a key, or the like, on the device to confirm the movement, step 707. A second preliminary direction to the victim X is determined at position B, and a second bearing is calculated as an angle δ from the preliminary direction to the north direction of the compass, step 708. Now, as shown in FIG. 5, it is possible to use trigonometry to determine a more accurate direction to the victim as well as a fairly good estimate of the distance to the victim.

This is done by seeing the positions A, B and X as tips of a triangle and determine angles α and β as the tip angles. Then α=φ−γ, and β=(180°−φ)+δ, where φ is the angle from compass north to the leg between A and B. Knowing now angles α and β and the distance L between A and B it is a simple task to calculate a current bearing and a current distance to the victim X, step 709.

Instead of having to rely on the users ability and consent to estimate a distance a GPS 125 may be used, as shown in the above embodiment of the device 100. In this embodiment, and preferably, the rescue device 100 is provided with a GPS terminal, and the GPS is an external unit that is connected to that terminal. When using the GPS 125 the user is only pushing a key in each one of the positions A and B, and the absolute GPS values as regards the positions A, B are sampled and used for calculating the distance L between the positions A, B. Then the current bearing and distance are calculated in the same way as above. In addition, when the GPS 125 is used, the position of the victim is determined and presented in the display 129 as numbers of latitude and longitude. This lat-long position can be used by other members of the rescue team, such as a helicopter pilot or a driver of a cross-country vehicle who is on his way to collect the victim.

Then the user moves directly towards the victim along the current bearing. The rotating receiver switch providing a continuous series of antenna signal data is used for continuously correcting the current bearing. When the GPS 125 is used, it is also possible to recalculate the current distance by means of repeated triangulations using new samples taken at predetermined time intervals.

Figure 6:
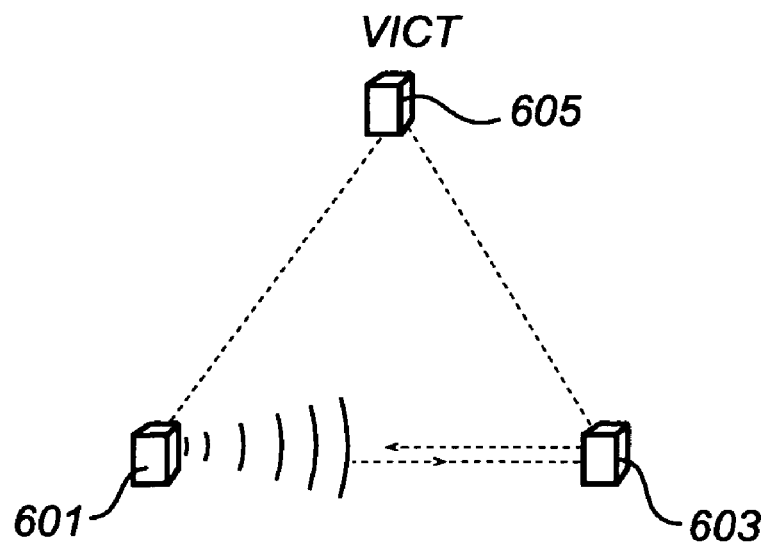
FIG. 6 illustrates communication between portable rescue devices.

The searching operation is simplified when at least two devices are used in search mode. Then the second communication unit 117 is used for communication between search devices. Assume that there are two search devices 601 and 603 as illustrated in FIG. 6. Assume that the first device 601 is switched to search mode. The first device 601 then starts scanning the antennas 203 of the distress receiver 107 in order to discover the victim 605. When the distress signal from the victim has been discovered, the first device 601 determines a first bearing to the victim 605 as explained above. So far the same steps as in the single device case have been performed, i.e. steps 701–704 in FIG. 7. Then the first device 601 makes a search for other devices (step 705) by transmitting a request for cooperation by means of the second communication unit 117. The first search device 601 then awaits response from other devices. It is also alert for incoming requests for cooperation from other devices. The second search device 603 receives the request from the first search device and responds to establish a communication channel on which the further communication will take place. Now the operation continues as shown in FIG. 8. Thus, the first search device 601 asks the second one if it has detected the same distress signal; step 801. A comparison is easy due to the device identification. If affirmative, the first search device asks for the bearing to the victim 605 from the second search device 603, which returns the bearing to the first search device; step 802. Similarly the second device 603 obtains the bearing from the first device 601. The search devices 601, 603 then measures the distance, step 803, between them by means of the ultrasonic sonar, or radio frequency distance meter, 121. Then they are both able to determine the current bearing and distance to the victim 605; step 804, and so the searching can begin; step 805. During the following search operation, the search devices 601, 603 continuously measures and exchanges new values, which are used to refine the search, i.e. increase the accuracy of the current bearing and the current distance; step 806.

In case there would be more than one victim the two search devices cooperate in determining current bearing and current distance to each victim that they do both reach a distress signal from. Then they cooperate in finding one victim at a time. Alternatively after having determined the current bearings and distances the search devices select different victims to go for, but, as far as relevant, continue to exchange information as described above in order to provide a better accuracy than a single device is able to achieve. Each search device continuously communicates the current bearing and distance to the user via the display. Another situation is where there are more than two search devices and more than one victim. Then the search devices cooperate in dividing the search devices into groups of at least two devices in each and distribute the victims among the groups. When a victim has been found the division of groups of search devices as well as the distribution of the victims among the groups are reconsidered. In this way the best possible result is obtainable.

When a victim has been located, the rescue device carried by the victim is turned off in order to let the search device(s) involved refocus on another victim. When there are several victims, in order to increase the efficiency of the search operation, such as increase the accuracy of the determination of the current bearing and current distance to a victim, and reduce the number of interfering distress signals, the distress transmitters which are currently of no interest for the search device(s) are (temporarily) turned off. This is done by a solitary search device or one out of a group of search devices sending the above-described disable signals to those rescue devices. Preferably, in addition, that search device sends the transmission power increase signal to the rescue device carried by the victim, which is to be located first. It should be noted that many different embodiments applying these advanced search capabilities to widely varying extents are possible within the scope of this invention. It is only possible to give a few examples here. When there are two or more groups concurrently searching for different victims, the transmission power of the distress signals of the rescue devices of all victims currently searched for is increased, while the other distress signals are temporarily turned off. In order for the power increased distress signals not to interfere with each other, the searching devices synchronise the distress signal transmissions such that the distress mode devices concurrently searched for are alternatingly transmitting.

As further examples, and as explained above, the search device is able to use different kinds of sensor signals for discriminating among a plurality of victims in order to apply a good search strategy. Thus, according to an embodiment, the body parameter sensor 113 providing values of body temperature, pulse and breathing rate is applied to the body of every person that carries a rescue device. Then, in the case of several victims, even if there is only a single search device, the body parameters of all victims are considered and compared. The body parameters are used by the search device(s) in conjunction with the distance values to determine a search strategy. The aim is to save as many victims as possible, typically by choosing to locate the victim being in best condition first, since that victim has the best chance to survive. Naturally, if the victims are spread over a large area, the distance may play a greater role than if they are closely gathered, since the time it takes to localise a victim is sometimes critical, such as when an avalanche has buried the victims.

Above, embodiments of the portable rescue device and the location method according to the present invention have been described. These should be seen as merely non-limiting examples. As understood by a skilled person, many modifications and alternative embodiments are possible within the scope of the invention.

For example, in an alternative embodiment the distress transmitter and receiver are merged into a transceiver using the antenna structure for both transmission and reception. Similarly, more antennas can be used, such as for the second communication unit. The antenna structure can be constituted by more as well as fewer antennas than the eight antennas shown in the figures.

In an alternative embodiment at least the distress antenna used by the transmitter is external, such as built into the clothing carried by the user or a harness associated with the device. By employing a harness antenna, it is possible to make the antenna large and use a lower output power. Additionally, a power attenuation that might appear due to a screening caused by the body of the victim covering the antenna is eliminated.

In an alternative embodiment the mode switch has three different positions, where an additional one is a touring mode. In the touring mode the distress signal is transmitted substantially less frequent than in the distress mode, and thereby power is saved. The touring mode is appropriate to use when there is reason to believe that the time to find a victim is less critical, and/or when the usage time before it will be possible to reload the rescue device or exchange the batteries thereof will be too large if the distress mode is used. Typically, the user carries the rescue device 100 in a fully turned off state, and when an accident occurs the user switches the device 100 into the touring mode.

The steps performed in different rescue situations can be performed in other orders than those exemplified above. Also steps may be added and deleted. For example, alternatively, the first thing being done when switching into the search mode can be looking for other devices which are also in the search mode. Not until after having established contact with one or more other devices the search operation will begin. Of course there will be a maximised time period for detecting other devices. When that time period has lapsed the search operation will begin anyhow.

It is to be noted, that for the purposes of this application, and in particular with regard to the appended claims, the word "comprising" does not exclude other elements or steps, that the word "a" or "an", does not exclude a plurality, and that at least some features represented as hardware are implementable as software as well, and vice versa, which per se will be apparent to a person skilled in the art.

The invention claimed is:

1. A portable rescue device comprising: a first communication unit comprising a distress signal transmitter and a distress receiver, said receiver including a directional antenna structure comprising multiple antennas arranged so as to provide directional capability;
   a compass;
   a processor;
   a user interface;
   a mode switch for switching between at least a search mode and a distress signal mode; and
   a second communication unit, arranged to communicate with another rescue device set in the search mode,
   wherein said processor has a temporary disabling capability, wherein the portable rescue device, when in distress mode, at the reception of a disable signal is disabled and then automatically enabled again after a preset time,
   wherein each distress signal carries a device identification of the transmitting portable rescue device, and
   wherein the portable rescue device, in said search mode, thereby being a search device, is arranged to:
   receive a distress signal from another rescue device, which is in the distress signal mode;
   obtain at least two different bearings to said another rescue device, said bearings being taken at different search device positions;
   obtain information at least one distance between at least two of said different search device positions;
   use said at least two bearings and said at least one distance for calculating a current distance and a current bearing from the portable rescue device to said another rescue device; and communicate said current distance and current bearing to a user of the rescue device.

2. A portable rescue device according to claim 1, wherein said portable rescue device is arranged to obtain at least one of said at least two different bearings from another rescue device by means of said second communication unit.

3. A portable rescue device according to claim 1, wherein the portable rescue device is arranged to determine said at least two bearings and said at least one corresponding distance itself, wherein the portable rescue device is arranged to, by means of said user interface, request the user to move said at least one distance.

4. A portable rescue device according to claim 1, further comprising an input terminal for connecting an external sensor, wherein said processor is arranged to process environmental data received from said external sensor via said input terminal.

5. A portable rescue device according to claim 4, said environmental data comprising user data of a user carrying the external sensor said user data comprising at least one of body temperature, pulse, and breathing rate.

6. A portable rescue device according to claim 4, wherein said environmental data is carried by said distress signal.

7. A portable rescue device according to claim 1, said multiple antennas being at least eight antennas and being symmetrically distributed around a circle at equidistant angles.

8. A method for locating, by means of a first rescue device set in a search mode, thereby being a search device, a second rescue device set in a distress mode, comprising the steps of:
   receiving a distress signal carrying a device identification from said second rescue device;
   obtaining a first bearing to said second rescue device, said first bearing taken from a first search device position;
   obtaining a second bearing to said second rescue device, said second bearing taken from a second search device position;
   obtaining a distance between said first and second search device positions;
   determining a current distance and a current bearing to said second rescue device on basis of said first and second bearings and said distance between said first and second positions;
   communicating said current bearing and said current distance to a user of the first rescue device; and
   when in distress mode, receiving a turn off signal; and then stop sending the distress signal for a predetermined time period.

9. A method according to claim 8, at least one of said steps of obtaining a first and obtaining a second bearing comprising the step of receiving the bearing from a third rescue device.

10. A method according to claim 9, said step of obtaining a distance comprises measuring the distance to said third rescue device.

11. A method according to claim 8, said step of obtaining a first bearing comprising determining said first bearing by means of said first rescue device; said step of obtaining a second bearing comprises said first rescue device being moved from said first position to said second position and determining said second bearing by means of said first rescue device.

12. A method according to claim 11, further comprising the step of requesting a user of the first rescue device to move said distance.

13. A method according to claim 8, further comprising the steps of:
when in search mode, determining that distress signals are received from several rescue devices; and
selectively turning off the distress signals of all but one of said rescue devices by transmitting a turn off signal accompanied by said device identification to each one thereof.

14. A method according to claim 13, said distress signals comprising environmental data, and said method further comprising the step of deciding which distress signals to turn off on basis of said environmental data.

15. A method according to claim 14, said environmental data comprising at least one of body temperature, pulse, and breathing rate.

16. A method according to claim 8, when in search mode, further comprising the steps of:
determining that several different distress signals are received;
determining that there are several rescue device in search mode;
automatically grouping said rescue devices in at least two groups, and automatically distributing said several distress signals among said at least two groups.

17. A method according to claim 8 said step of obtaining a distance is based on at least one of obtaining GPS values about said positions, measuring a distance between different rescue devices by signal communication between them, and requesting a user to input a distance value.

* * * * *